(12) United States Patent
Lyman et al.

(10) Patent No.: US 11,024,293 B1
(45) Date of Patent: Jun. 1, 2021

(54) SYSTEMS AND METHODS FOR PERSONIFYING COMMUNICATIONS

(71) Applicant: Vivint, Inc., Provo, UT (US)

(72) Inventors: Jefferson Lyman, Alpine, UT (US); Nic Brunson, Salt Lake City, UT (US); Wade Shearer, Lehi, UT (US); Mike Warner, Payson, UT (US); Stefan Walger, Salt Lake City, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/101,475

(22) Filed: Aug. 12, 2018

Related U.S. Application Data

(63) Continuation of application No. 15/489,414, filed on Apr. 17, 2017, now Pat. No. 10,049,660, which is a continuation of application No. 14/607,887, filed on Jan. 28, 2015, now Pat. No. 9,626,961.

(60) Provisional application No. 61/934,180, filed on Jan. 31, 2014.

(51) Int. Cl.
*G10L 15/18* (2013.01)
*G06F 40/20* (2020.01)
*G06F 40/42* (2020.01)
G10L 13/027 (2013.01)
G10L 15/22 (2006.01)

(52) U.S. Cl.
CPC .............. *G10L 15/18* (2013.01); *G06F 40/20* (2020.01); *G06F 40/42* (2020.01); *G10L 13/027* (2013.01); *G10L 2015/227* (2013.01)

(58) Field of Classification Search
CPC ....... G06F 17/02; G10L 15/18; G10L 13/027; G10L 2015/227
USPC .......................... 704/1, 9, 10, 257, 270–275
See application file for complete search history.

(56) References Cited

U.S. PATENT DOCUMENTS

| | | | |
|---|---|---|---|
| 5,613,036 A | 3/1997 | Strong | |
| 8,380,504 B1 | 2/2013 | Peden et al. | |
| 9,626,961 B2 * | 4/2017 | Lyman | G10L 15/18 |
| 10,049,660 B2 * | 8/2018 | Lyman | G10L 15/18 |
| 2004/0019489 A1 * | 1/2004 | Funk | H04L 12/2803 |
| | | | 704/275 |
| 2004/0194036 A1 | 9/2004 | Wolska et al. | |

(Continued)

OTHER PUBLICATIONS

Murata et al. "Automatic extraction of differences between spoken and written languages, and automatic translation from the written to the spoken language". In Proc. Int. Conf. Language Resources and Evaluation, Las Palmas, Spain, 2002 (Year: 2002).*

*Primary Examiner* — Jesse S Pullias
(74) *Attorney, Agent, or Firm* — Holland & Hart, LLP

(57) ABSTRACT

Systems and methods are described for personifying communications. According to at least one embodiment, the computer-implemented method for personifying a natural-language communication includes observing a linguistic pattern of a user. The method may also include analyzing the linguistic pattern of the user and adapting the natural-language communication based at least in part on the analyzed linguistic pattern of the user. In some embodiments, observing the linguistic pattern of the user may include receiving data indicative of the linguistic pattern of the user. The data may be one of verbal data or written data. Written data may include at least one of a text message, email, social media post, or computer-readable note. Verbal data may include at least one of a recorded telephone conversation, voice command, or voice message.

20 Claims, 7 Drawing Sheets

(56) References Cited

U.S. PATENT DOCUMENTS

| | | |
|---|---|---|
| 2005/0119897 A1* | 6/2005 | Bennett ................ G10L 15/005 704/270.1 |
| 2005/0171926 A1 | 8/2005 | Thione et al. |
| 2007/0094183 A1 | 4/2007 | Paek et al. |
| 2010/0235165 A1* | 9/2010 | Todhunter ............... G06F 40/35 704/9 |
| 2012/0109884 A1 | 5/2012 | Goldentouch |
| 2012/0290299 A1 | 11/2012 | Basson et al. |
| 2013/0093668 A1 | 4/2013 | Kim et al. |
| 2014/0257791 A1* | 9/2014 | Nhiayi .................. G06F 17/274 704/9 |

* cited by examiner

SYSTEMS AND METHODS FOR PERSONIFYING COMMUNICATIONS

CROSS REFERENCE

This application is a continuation of U.S. patent application Ser. No. 15/489,414 entitled "SYSTEMS AND METHODS FOR PERSONIFYING COMMUNICATIONS," which was filed Apr. 17, 2017, which is a continuation of U.S. patent application Ser. No. 14/607,887 entitled "SYSTEMS AND METHODS FOR PERSONIFYING COMMUNICATIONS," which was filed on Jan. 28, 2015 and claims priority from U.S. Provisional Patent Application No. 61/934,180 entitled "SYSTEMS AND METHODS FOR PERSONIFYING COMMUNICATIONS," which was filed 31 Jan. 2014, and assigned to the assignee hereof.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business automation system. Communication exchanges with the automation system can be artificial and unrefined and can, in some instances, cause confusion.

SUMMARY

According to at least one embodiment, the computer-implemented method for personifying a natural-language communication includes observing a linguistic pattern of a user. The method may also include analyzing the linguistic pattern of the user and adapting the natural-language communication based at least in part on the analyzed linguistic pattern of the user.

In some embodiments, observing the linguistic pattern of the user may include receiving data indicative of the linguistic pattern of the user. The data may be one of verbal data or written data. Written data may include at least one of a text message, email, social media post, or computer-readable note. Verbal data may include at least one of a recorded telephone conversation, voice command, or voice message.

In some embodiments, the method may further compare the written data and the verbal data and identify differences between the written data and the verbal data. In some instances, the method may also identify a geographical location of the user indicative of a geographical region and adapt the natural-language communication to use colloquialisms associated with the geographical region.

In further embodiments, when analyzing the linguistic pattern of the user, the method may also identify words or phrases preferred by the user and identify a preferred sentence structure of the user. In some embodiments, the words or phrases may include slang words or colloquialisms. In some instances, the method may identify a geographical region associated with the colloquialisms and adapt the natural-language communication to use colloquialisms associated with the geographical region. In further examples, the method may identify an age group associated with the slang words and colloquialisms and adapt the natural-language communication to use slang words and colloquialisms associated with the age group.

In some embodiments, the method may generate a message to deliver to the user. In some instances, the message may communicate an event within an automation system.

In some embodiments, adapting the natural-language communication may include updating an algorithm based at least in part on the analyzed linguistic pattern of the user. The algorithm may generate a message to deliver to the user.

According to another embodiment, an apparatus for personifying a natural-language communication is also described. The apparatus may include a processor, a memory in electronic communication with the processor and instructions stored on the memory of the processor. The processor may execute the instructions to observe a linguistic pattern of a user, analyze the linguistic pattern of the user, and adapt the natural-language communication based at least in part on the analyzed linguistic pattern of the user.

In some embodiments, the apparatus may be associated with an automation system. The natural-language communication may be adaptive to individual users of the automation system. In some instances, the natural-language communication may convey an event at the automation system.

According to another embodiment, a computer-program product for personifying a natural-language communication is described. The computer-program product may include a non-transitory computer-readable medium that may store instructions executable by a processor. The instructions may observe a linguistic pattern of a user, analyze the linguistic pattern of the user, and adapt the natural-language communication based at least in part on the analyzed linguistic pattern of the user. In some embodiments, the computer-program product may be associated with an automation system and the natural-language communication may convey an event at the automation system. In further embodiments, the natural-language communication may be one of a text message, ping message, email, or voice message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
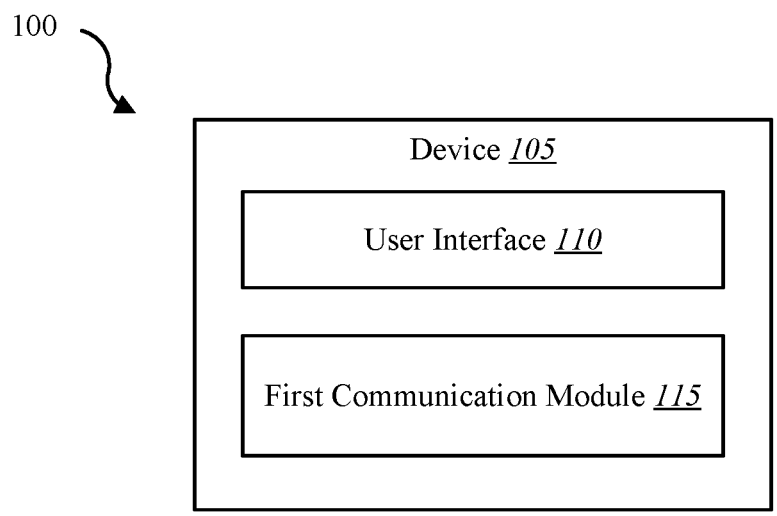
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial, residential, and business settings. More specifically, the systems and methods described herein relate to improved systems and methods of communicating with users of an automation system. The communication system may enable more personal, natural-language communication between the user and the automation system.

FIG. 1 is a block diagram illustrating one embodiment of an environment 100 in which the present systems and methods may be implemented. In some embodiments, the systems and methods described herein may be performed at least in part on or using a device 105. The environment 100 may include the device 105, a user interface 110, and a first communication module 115.

The first communication module 115 may be configured to communicate with a user of the device 105 using natural-language communication. For example, communicating with the user of the device 105 may include personifying the natural-language communication. This may involve the first communication module 115 adapting the communication to mimic a linguistic pattern of the user. Adapting to the linguistic style of the user may allow the first communication module 115 to readily convey information to the user. The information may communicate an event or interaction within an automation system. The information may further be conveyed as written or verbal message. The user interface 110 may facilitate communication between the user and the device 105.

Figure 2:
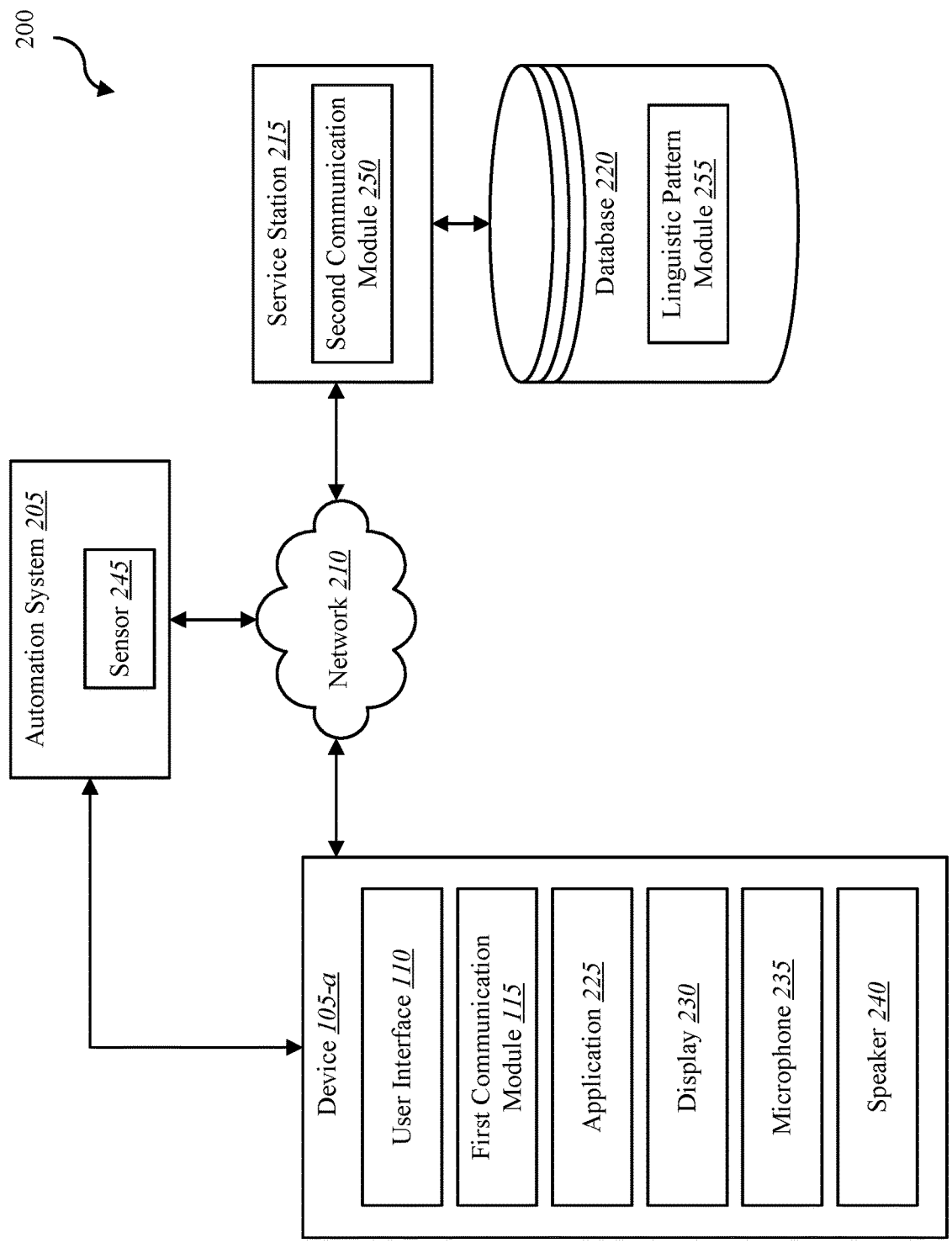
FIG. 2 is a block diagram of another environment in which the present systems and methods may be implemented.

Referring now to FIG. 2, in some embodiments, an environment 200 may include the components of the environment 100 described above, and may further include an automation system 205, a network 210, a service station 215, and a database 220. Additionally, the environment 200 may include a device 105-a, which may be one example of the device 105 described above with reference to FIG. 1. The device 105-a may additionally include an application 225, a display 230, a microphone 235, and a speaker 240. The device 105-a may include various components and functionalities that work cooperatively with the user interface 110 and the first communication module 115, and/or may operate independently of the user interface 110 and the first communication module 115.

In some embodiments, the device 105-a may include one or more processors, one or more memory devices, and/or a storage device. Examples of the device 105-a may include mobile phones, smart phones, tablets, personal digital assistants (PDAs), wearable computers, ultra-mobile PCs, etc. Further examples of the device 105-a may include a viewing device associated with a media content set top box, satellite set top box, cable set top box, DVRs, personal video recorders (PVRs), personal computing devices, computers, servers, etc. Additionally or alternatively, the device 105-a may represent an automation controller which may be one of a wall-mounted controller, a remote control, a voice activated controller, or the like. In some embodiments, the device 105-a may represent a single device or multiple devices.

In some embodiments, the device 105-a may connect directly to the automation system 205. In further embodiments, the device 105-a may connect to the automation system 205 over the network 210. In some embodiments, the device 105-a may control aspects of a monitored property as well as to receive notifications regarding monitored activity of the property. The notifications may be written notifications or verbal messages. For example, the notifications may be a text message, email, ping message, voice message, voicemail, phone call, or the like.

In some embodiments, the automation system 205 may include a sensor 245. The sensor 245 shown in FIG. 2 may represent one or more separate sensors or a combination of two or more sensors in a single sensor device. For example, the sensor 245 may represent one or more camera sensors and one or more motion sensors connected to environment 200. Additionally, or alternatively, the sensor 245 may represent a combination sensor such as both a camera sensor and a motion sensor integrated in the same sensor device. Although the sensor 245 is depicted as connecting directly to automation system 205, in some embodiments, the sensor 245 may connect to the automation system 205 over the network 210. Additionally, or alternatively, the sensor 245 may be integrated with a home appliance or fixture such as a light bulb fixture. The sensor 245 may include an accelerometer to enable the sensor 245 to detect movement. The sensor 245 may include a wireless communication device enabling the sensor 245 to send and receive data and/or information to and from one or more devices in the environment 200. Additionally, or alternatively, the sensor 245 may include a GPS sensor to enable the sensor 245 to track a location of the sensor 245. The sensor 245 may include a proximity sensor to enable the sensor 245 to detect proximity of a person relative to a predetermined distance from a dwelling (e.g., geo-fencing). The sensor 245 may include one or more security detection sensors such as, for example, a glass break sensor, a motion detection sensor, or both. Additionally, or alternatively, the sensor 245 may include a smoke detection sensor, a carbon monoxide sensor, or both.

In some embodiments, the application 225 may allow a user to control an aspect of the monitored property, including security, energy management, locking or unlocking a door, checking the status of a door, locating a person or an item, controlling lighting, thermostats, cameras, receiving notification regarding a current status or an anomaly associated with a home, an office, a place of business, and the like. In some configurations, the application 225 may enable the automation system 205 to interface with the device 105-a and enable the user interface 110 to communicate automation, security, and/or user management content via the display 230 or the speaker 240.

In some embodiments, the device 105-a may communicate with the automation system 205 and the service station 215 via the network 210. Examples of the network 210 include cloud networks, local area networks (LAN), wide area networks (WAN), virtual private networks (VPN), wireless networks (using 802.11, for example), and/or cellular networks (using 3G and/or LTE, for example), etc. The network 210 may be a single network, or may include multiple interconnected, overlapping, or coincidental networks. For example, in some embodiments, the network 210 may include multiple networks interconnected to facilitate communication or may include redundant networks. For example, the network 210 may represent a first network (e.g., the Internet) and a second network (e.g., cellular networks).

The service station 215 shown in FIG. 2 may represent one or more separate service stations or a combination of service stations. The service station 215 may be a network operations center, a monitoring center, a service station or any similar station in association with a provider of the automation system. In some embodiments, the service station 215 may include a second communication module 250. The second communication module 250 may communicate events, occurrences, or the like associated with the automation system 205.

In some embodiments, the service station 215 may be coupled to the database 220. The database 220 may include, for example, linguistic patterns for individual users associated with each automation system 205 monitored by the service station 215. For example, the database 220 may include a linguistic pattern module 255 which may store the linguistic patterns of users associated with each automation system 205. The database 220 may include other information including, for example, historical information about the automation system 205 and other aspects of the environment 200, contact information for various response personnel, and the like.

Figure 3:
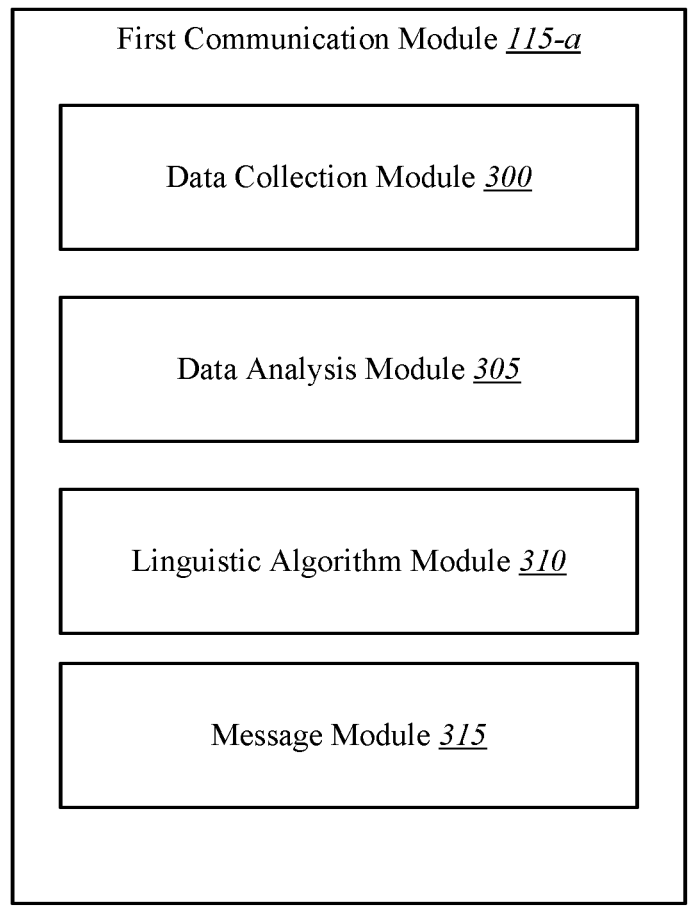
FIG. 3 is a block diagram of an example first communication module of the environments shown in FIGS. 1 and 2.

FIG. 3 is a block diagram illustrating one example of a first communication module 115-a. The first communication module 115-a may be one example of the first communication module 115 depicted in FIGS. 1 and/or 2. As depicted, the first communication module 115-a may include a data collection module 300, a data analysis module 305, a linguistic algorithm module 310, and a message module 315. The first communication module 115-a may include additional modules and capabilities in other embodiments. Similarly, the first communication module 115-a may include a fewer number of modules and functionalities than that which is described with reference to FIG. 3. The first communication module 115-a may personify natural-language communications. For example, the first communication module 115-a may adapt communications sent to a user to contain a natural-language style. The first communication module may further adapt the natural-language message based at least on a linguistic pattern of the user.

In some embodiments, the data collection module 300 may collect various linguistic data. For example, the data collection module 300 may collect verbal data or written data associated with a user. The data may be indicative of a linguistic pattern of the user. The verbal data may include at least one of a recorded telephone conversation, voice command, voice message, or the like. For example, the user may be using a device (e.g. device 105) with a user interface (e.g., user interface 110). For example, the user interface may allow the data collection module 300 to gather recorded voice data. In some instances, the device may include a microphone (e.g., microphone 235) capable of collecting the user's speech. The data collection module 300 may use the microphone to record the user's speech.

In other embodiments, the data collection module 300 may collect written data indicative of a linguistic pattern associated with the user. Written data may include at least one of a text message, email, social media post, computer-readable note, or the like. In some embodiments, the data collection module 300 may use a device (e.g. device 105) associated with the user to gather information. For example, the device may have a user interface associated with a keyboard for entering text (i.e. written data). The data collection module 300 may gather the written data.

In some embodiments, the data analysis module 305 may analyze the data collected by the data collection module 300. For example, the data analysis module 305 may identify the verbal and written linguistics patterns of the user. The linguistic patterns may include the form, meaning, and context of language. In some embodiments, linguistic patterns may include sentence structure, colloquialisms, phrases, speech patterns, writing patterns, writing style, grammar habits, a user's lexicon, discourse, dialect, or the like.

In some embodiments, the data analysis module 305 may differentiate and identify the written and verbal linguistic patterns of a particular user. For example, the data analysis module 305 may determine a particular linguistic written pattern of the user. This may include identifying the relationship between the words used to form a sentence and determine written habits of the user. For example, a user may prefer to use passive writing; another user may prefer use conjunctions. In further examples, a user may prefer to use shorthand. The data analysis module 305 may identify these types of linguistic patterns.

In further embodiments, the data analysis module 305 may analyze the verbal linguistic patterns of a user. For example, the data analysis module 305 may determine the spoken sentence structure patterns of a user. For example, the user may use proper English or Gregarian language. A user may use more colloquialisms when speaking than when writing. The data analysis module 305 may identify all these patterns.

In some embodiments, the data analysis module 305 may identify colloquialisms or slang words used in the verbal and written data. In some instances, the colloquialisms or slang words may be generic. In other instances, the colloquialisms and slang words may reveal information about the user. For example, the data analysis module 305 may determine if the slang words and colloquialisms identify an age group or geographical region associated with the user. For example, some colloquialisms are inherent in a general geographical region (e.g., sneakers versus tennis shoes, bubbler versus drinking fountain versus water fountain). The data analysis module 305 may collect the various colloquialisms and use them to map a geographic region associated with the user. In other embodiments, slang words may reveal information about the user. For example, the data analysis module 305 may identify slang words associated with a particular age group (e.g., lol, wassup, ducky, and how, peeps, etc.).

In some embodiments, the first communication module 115-a may contain geographical information relating to the location of a device or an automation system. Therefore, the first communication module 115-a may use linguistic patterns associated with that geographical region. However, in some instances, a user may be from a different geographical region. In those instances, the data analysis module 305 may identify a geographical region where the user is from and adapt to the local jargon. For example, a user may be from the Northeast but may have moved to the Mountain West and installed an automation system at a home there. The first communication module 115-a may initially use Mountain West jargon. However, the first communication module 115-a may adapt to use jargon of the Northeast to conform with the linguistic patterns of the user based at least in part on the analysis performed by the data analysis module 305.

The linguistic algorithm module 310 may use the analysis generated by the data analysis module 305 to create, adapt, update, or correct a linguistic algorithm. For example, the linguistic algorithm module 310 may contain an algorithm for generating natural-language communications. The algorithm may be a generic algorithm that generates a generic natural-language communication. In other embodiments, the algorithm may be unique to the user. For example, the algorithm may adapt to the linguistic pattern of the user. In some instances, the algorithm may include colloquialisms preferred by the user. The linguistic algorithm module 310 may adapt to an age group associated with the user. For example, the data analysis module 305 may identify an age group associated with the user, the linguistic algorithm module 310 may then incorporate other slang words and colloquialisms associated with that age group.

The linguistic algorithm module 310 may also contain different algorithms based on the linguistic patterns of a user's written or verbal communications. For example, the data analysis module 305 may identify different patterns in a user's written and verbal communications. The differences may require different algorithms to adapt communications to their delivery method. For example, a written linguistic algorithm may generate written communications and a verbal linguistic algorithm may generate verbal communications.

In further embodiments, as discussed below, the linguistic algorithm module 310 may communicate with a linguistic algorithm module 410 associated with a second communication module 250-a (See FIG. 4).

In some embodiments, the first communication module 115-a may further include the message module 315. The message module 315 may use the algorithm in the linguistic algorithm module 310 to generate a message. The message may convey information to a user of an automation system. For example, the message may alert the user to an unauthorized entry to an automation system, that an automation system is armed/disarmed, that a door was left unlocked, that another user accessed the system, or the like. The message may be a text message, ping message, email, voice message, phone call, or the like.

In some embodiments, the message may be a natural-language communication. For example, the natural-language communication may appear to be generated by a person rather than a computer. In some instances, the user may easily interpret the natural-language communication and its meaning. In some instances, the natural-language communication may ease the anxiety a user experiences when interfacing with an automation system. As the linguistic algorithm module 310 advances, the messages generated by the message module 315 may be more refined. Therefore, the user may eventually feel as though they are talking to a friend rather than a computer. For example, the natural-language communication may adapt to linguistic patterns of the user.

Figure 4:
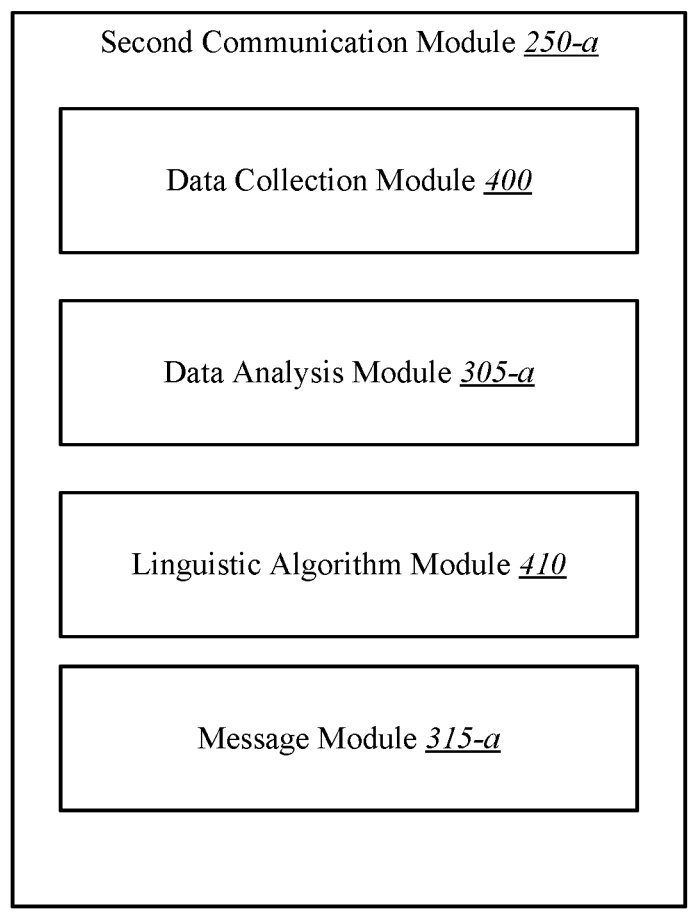
FIG. 4 is a block diagram of an example second communication module of the environment shown in FIG. 3.

FIG. 4 is a block diagram illustrating one example of the second communication module 250-a. The second communication module 250-a may be one example of the second communication module 250 depicted in FIG. 2. As depicted, the second communication module 250-a may include a data collection module 400, a data analysis module 305-a, a linguistic algorithm module 410, and a message module 315-a. The second communication module 250-a may include additional modules and capabilities in other embodiments. Similarly, the second communication module 250-a may include a few number of modules and functionalities than that which is described with reference to FIG. 4.

The data collection module 400 may operate similar to data collection module 300 (See FIG. 3). For example, data collection module 400 may collect various written and verbal data associated with a user. However, since the data collection module 400 is remote from the user, a device (e.g. device 105) associated with a user may collect and transfer the data to the data collection module 400. In some embodiments, the device may automatically send data to the data collection module 400. In other embodiments, the data collection module 400 may request information from the device. The device may be any device associated with the user and the data collection module 400 may communicate with a variety of devices. In some embodiments, the device and the data collection module 400 may communicate over a network (e.g., network 210).

The data analysis module 305-a may be one example of a data analysis module 305 depicted in FIG. 3. Therefore, data analysis module 305-a may perform similar functions as data analysis module 305.

The linguistic algorithm module 410 may operate similar to linguistic algorithm module 310 (See FIG. 3). For example, the linguistic algorithm module 410 may perform the same functions as the linguistic algorithm module 310. In some embodiments, the linguistic algorithm module 410 and the linguistic algorithm module 310 may communicate. For example, the linguistic algorithm module 410 may use the data analyzed by the data analysis module 305-a to adapt to a linguistic pattern of the user. The linguistic algorithm module 410 may send adapted algorithm to the linguistic algorithm module 310 to ensure both modules 310, 410 are using substantially the same algorithms. Similarly, updates made by the linguistic algorithm module 310 may be sent to the linguistic algorithm module 410. In some embodiments, the linguistic algorithm module 410 may ping the linguistic algorithm module 310 for updates and vice versa. Therefore, in some embodiments, the natural-language communication may appear the same regardless of whether the first or second communication module 115-a, 250-b generated it.

The message module 315-a may be one example of the message module 315 depicted in FIG. 3. Therefore, the message module 315-a may perform similar functions as the message module 315.

Figure 5:
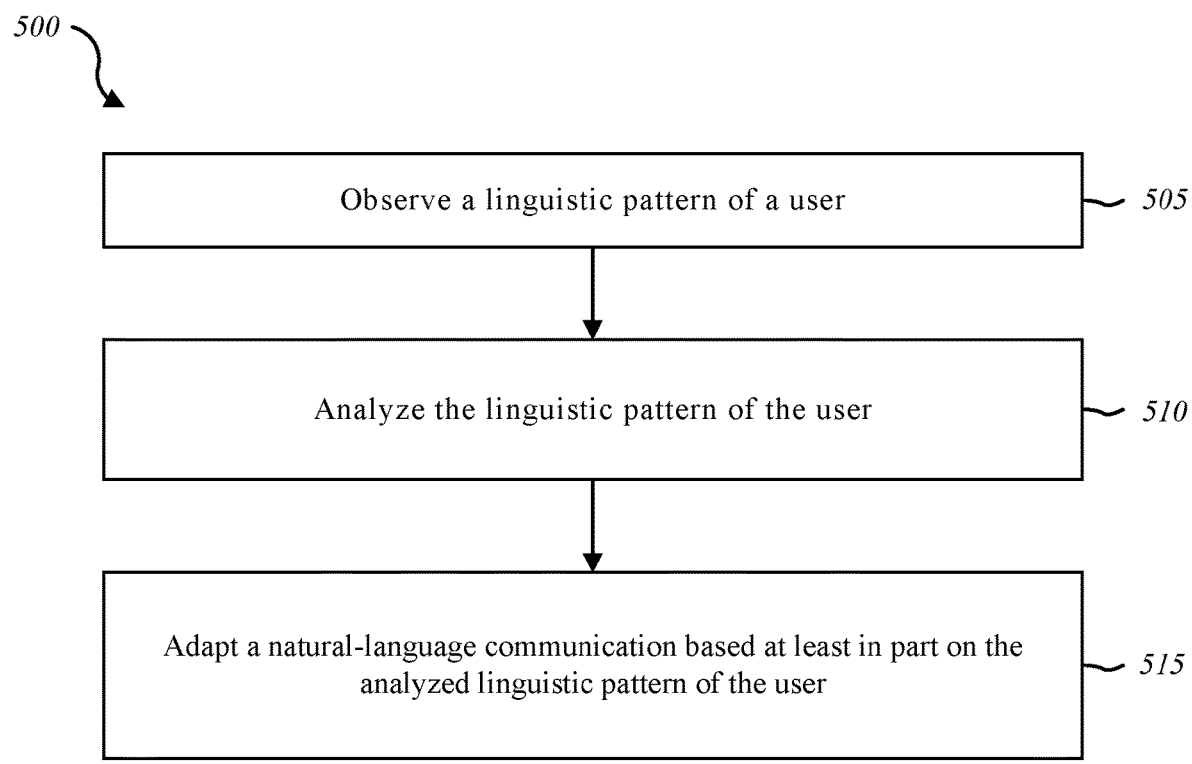
FIG. 5 is a flow diagram illustrating a method for personifying a natural-language communication.

FIG. 5 is a flow diagram illustrating one embodiment of a method 500 for personifying a natural-language communication. In some configurations, the method 500 may be implemented in whole or in part by the first communication module 115 shown in FIGS. 1, 2 and/or 3. In further configurations, the method 500 may be implemented in whole or in part by the second communication module 250 shown in FIGS. 2 and/or 4. In still further embodiments, the method 500 may be performed generally by the device 105 shown in FIGS. 1 and/or 2, or even more generally by the environments 100, 200 shown in FIGS. 1 and/or 2.

At block 505, the linguistic pattern of a user may be observed. This may include collecting verbal and written data indicative of a linguistic pattern of the user. The data may be collected via a device (e.g. device 105). In some embodiments, the device may collect and store the data. In other embodiments, the device may transfer the data to a service station which may additionally or alternatively collect and store the data.

In further embodiments, the data may be collected via a survey. For example, at block 505, the user may be given a survey containing different questions to assess the linguistic characteristics of the user. The survey may be a written and/or verbal survey. It may include multiple choice question, yes/no questions, open-ended questions, or some combination of different types of questions. In some embodiments, the survey may set a baseline for adapting the natural-language communications to a linguistic pattern of the user.

At block 510, the linguistic pattern of the user may be analyzed. For example, the different characteristics and individualisms of the linguistic pattern may be observed and recorded. In some embodiments, the verbal and written data may be differentiated and analyzed separately. In other embodiments, the written data and verbal data may be analyzed concurrently.

At block 515, a natural-language communication may be adapted based at least in part on the analyzed linguistic pattern of the user. This may include adapting the natural-language communication to use words or phrases favored by the user. The natural-language communication may also adapt to a preferred sentence structure or syntax of the user. In some embodiments, the natural-language communication may adapt to use slang words or colloquialisms associated with an age group and/or a geographical region associated with the user. The natural-language communication may differ for verbal and written data, or in some instances, may be the same for both verbal and written communications.

Figure 6:
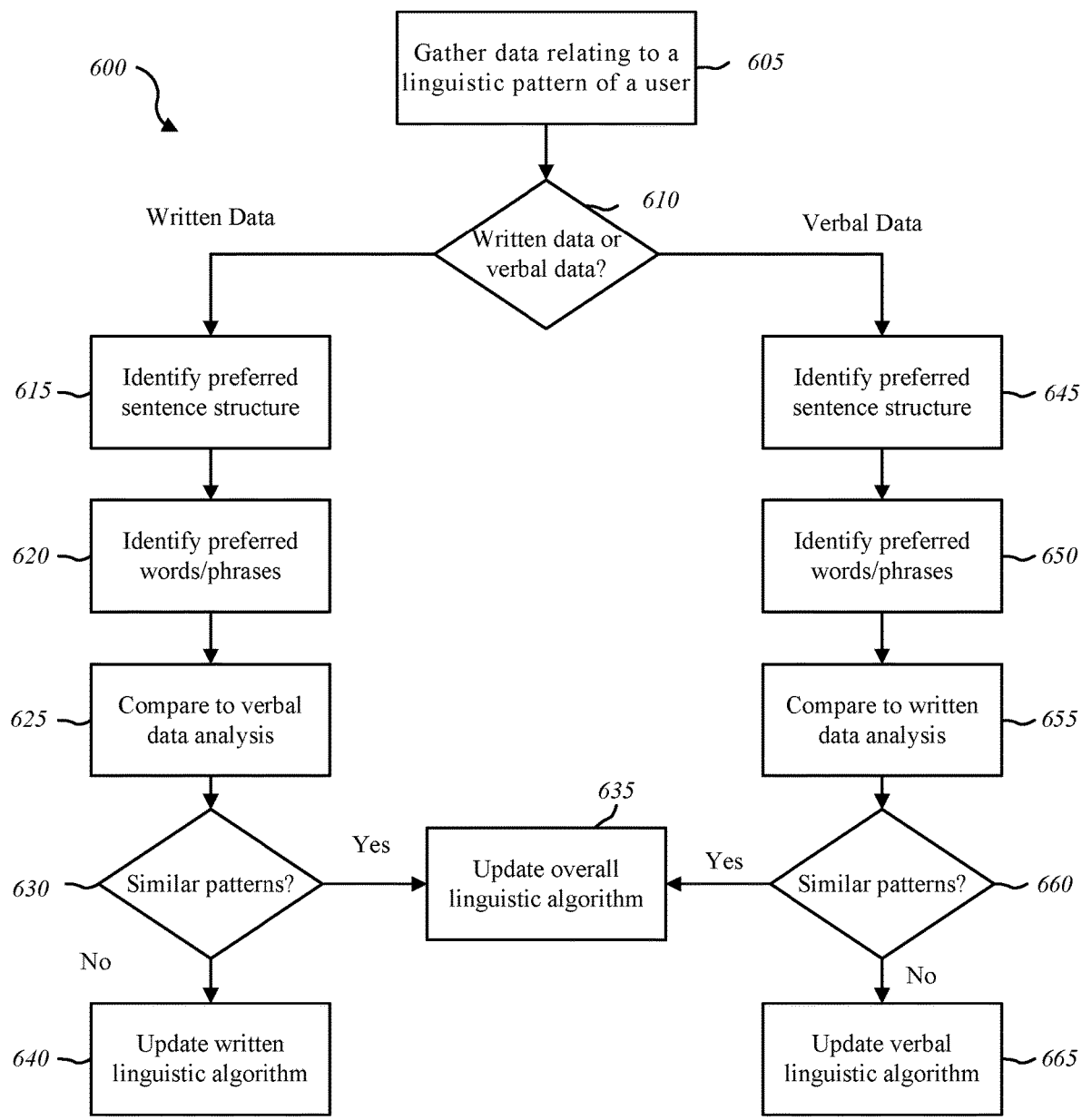
FIG. 6 is a flow diagram illustrating another method for personifying a natural-language communication.

FIG. 6 is a flow diagram illustrating one embodiment of a method 600 to personify a natural-language communication. In some configurations, the method 600 may be implemented in whole or in part by the first communication module 115 depicted in FIGS. 1, 2, and/or 3. In other embodiments, the method 600 may be implemented in whole or in part by the second communication module 250 depicted in FIGS. 2 and/or 4. In some configurations, the method 600 may be implemented in whole or in part with the method 500 depicted in FIG. 5.

At block 605, data may be gathered relating to a linguistic pattern of the user. The data may be gathered by a device (e.g. device 105) or conversely may be gathered by a service station (e.g. service station 215). At block 610, it may be determined whether the data is written data or verbal data.

If the data is written data, at block 615, a preferred sentence structure may be identified. For example, the sentence structure of the user may be analyzed to determine the type of sentence structure the user prefers. For instance, a user may prefer to use one of a simple sentence, complex sentence, compound sentence, special compound sentence, or the like. In some instances, a user may prefer to use a combination of sentence structures.

At block 620, preferred words or phrases may be identified. For example, a series of colloquialisms or slang words preferred by the user may be identified. In some instances, the relationship between the words or phrases and structure of the words or phrases may also be identified. For example, a user may prefer to write-out numbers (e.g. 5 versus five). A user may also use emoticons or internet slang (e.g. :o) or lol, rofl). In other embodiments, a user may prefer conjunctions. Other types of linguistic patterns may also be identified. In some embodiments, at block 620, the preferred words or phrases may categorize the individual user. For example, the preferred words or phrases may identify a geographical region, dialect, or age group associated with the user.

At block 615, the written data analysis may be compared to a verbal data analysis (if available). For example, at block 615, the sentence structures of the verbal and written data, as well as preferred words and phrases, may be compared. At block 630, it may be determined if the data shows similar patterns. If the comparison does not shown similar patterns, at block 640, a written linguistic algorithm may be updated. If the data is similar, the method 600 may continue to block 635. At block 635, an overall linguistic algorithm may be updated. The overall linguistic algorithm may generate both written and verbal communications.

If, at block 610, it is determined the data is verbal data, the method 600 may continue to block 645. At block 645, a preferred sentence structure may be identified. Similar to block 615, the sentence structure of the user may be analyzed to determine the type of sentence structure the user prefers. For instance, a user may prefer to use one of a simple sentence, complex sentence, compound sentence, special compound sentence, or the like. In some instances, a user may prefer to use a combination of sentence structures.

At block 650, preferred words or phrases may be identified. Similar to block 620, a series of colloquialisms or slang words preferred by the user may be identified. In some instances, the relationship between the words or phrases and structure of the words or phrases may also be identified. For example, a user may use slang or may speak in internet slang (e.g. don't know versus dunno, y'all, or saying LOL, ROFL, etc.). In some embodiments, at block 620, the preferred words or phrases may categorize the individual user. For example, the preferred words or phrases may identify a geographical region, dialect, or age group associated with the user.

At block 655, the verbal data analysis may be compared to the written data analysis (if the written data analysis is available). At block 660, it may be determined if the verbal data and written data have similar patterns. If similar patterns exist, at block 635, an overall linguistic algorithm may be updated. If similar patterns do not exist, at block 665, a verbal linguistic algorithm may be updated. The verbal linguistic algorithm may generate verbal messages.

In some embodiments, the verbal, written, or overall linguistic algorithms (referred to generally in this paragraph as "algorithm") may be updated at various time intervals. For example, the algorithm may be updated at set time intervals. For example, it may be updated approximately every half-hour, hourly, bi-daily, daily, weekly, monthly, etc. In some embodiments, the algorithm may be updated more frequently for a new user and less frequently for an older user. For example, for a new user, the algorithm may be updated daily, whereas an older user's algorithm may be updated monthly. As the new user's algorithm becomes more personalized, the algorithm may reduce the frequency of updates. For example, the algorithm may first update every bi-daily, then daily, then bi-weekly, then weekly, etc. As the algorithm is refined, it may update less often.

In other embodiments, the algorithm may not be updated on a set time table, but rather based upon the amount of information observed and analyzed. For example, the method 500 may have a predetermined amount of data to collect before updating the algorithm to ensure a proper sampling size. In some instances, this may include approximately five different pieces of data (e.g., two emails, one text message, two voice commands, and one voice message). In other embodiments, it may include more or less. As with a set time table updating system, using a data set, the algorithm may update more frequently at first then expand out to update after a larger sampling size is collected.

Figure 7:
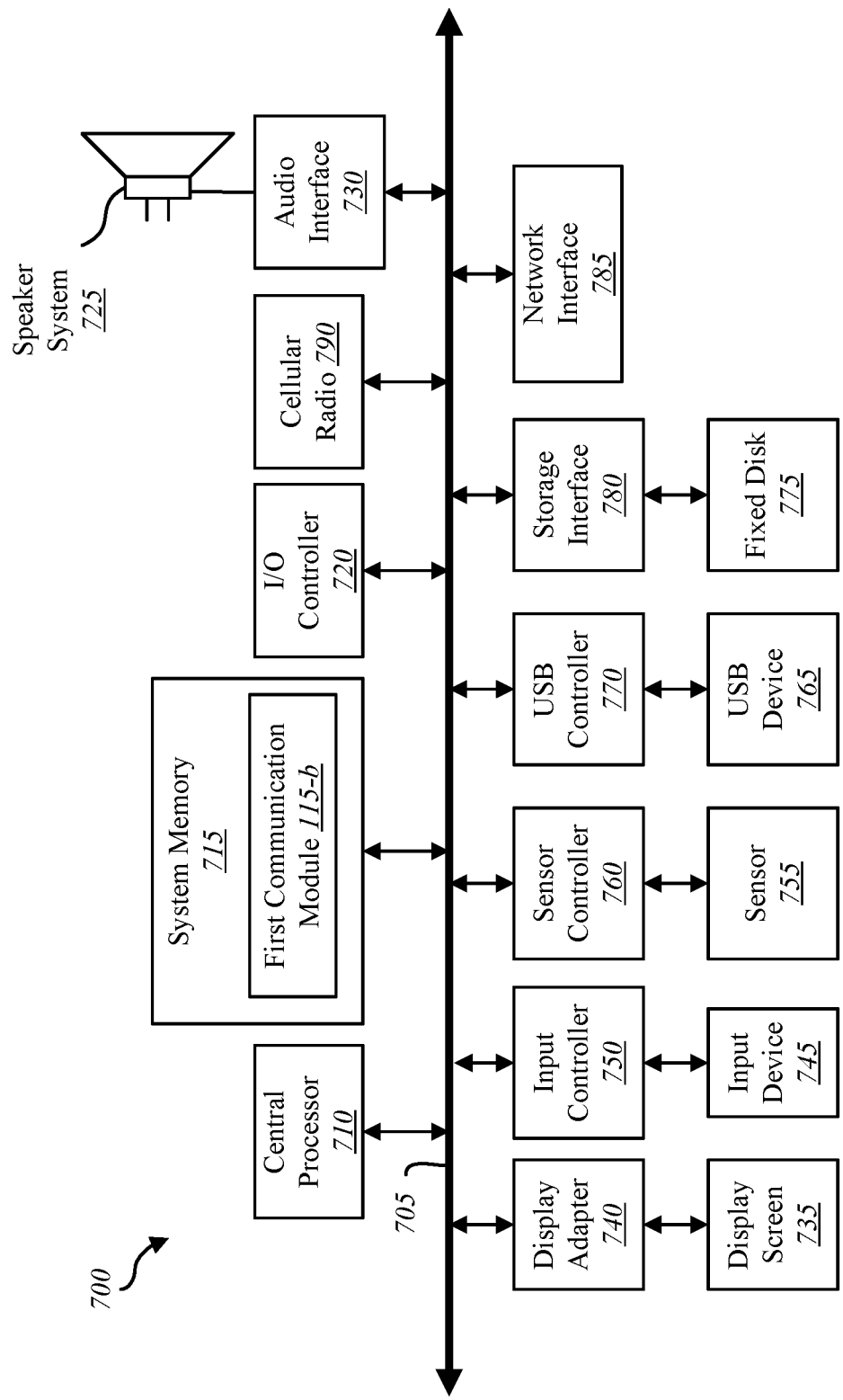
FIG. 7 is a block diagram of a computer system suitable for implementing the present systems and methods of FIGS. 1 and 2.

FIG. 7 depicts a block diagram of a controller 700 suitable for implementing the present systems and methods. The controller 700 may be an example of the device 105 illustrated in FIGS. 1 and/or 2. In one configuration, the controller 700 may include a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), one or more cellular radios 790, and a storage interface 780. Also included are at least one sensor 755 connected to bus 705 through a sensor controller 760 and a network interface 785 (coupled directly to bus 705).

Bus 705 may allow data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, first communication module 115-b to implement the present systems and methods may be stored within the system memory 715. The first communication module 115-b may be an example of the first communication module 115 illustrated in FIGS. 1, 2, and/or 3. Applications (e.g., application 225) resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via network interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785. In one configuration, the cellular radio 790 may include a receiver and transmitter to wirelessly receive and transmit communications via, for example, a cellular network. The cellular radio 790 may be used to transmit information to the service station 215 via the network 210.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for generating a natural-language communication message at an automation system of a premises, comprising:
   receiving, at the automation system, a communication from a user;
   determining, by the automation system and based at least in part on receiving the communication, an aggregate linguistic pattern of the user that is based at least in part on a comparison of an oral linguistic pattern of the user with a written linguistic pattern of the user;
   identifying system information to communicate to the user, wherein the system information is associated with a status of the automation system in relation to the premises; and
   generating, at the automation system, the natural-language communication message based at least in part on the aggregate linguistic pattern of the user and the identified system information, the natural-language communication message comprising a notification of the identified system information.

2. The method of claim 1, further comprising:
   identifying one or more words or phrases of the user based at least in part on receiving the communication, wherein determining the aggregate linguistic pattern of the user is based at least in part on identifying the one or more words or phrases.

3. The method of claim 2, further comprising:
   identifying a geographical region associated with the one or more words or phrases of the user, wherein the natural-language communication message is based at least in part on the geographical region associated with the one or more words or phrases of the user.

4. The method of claim 1, wherein the communication from the user comprises an oral communication from the user, a written communication from the user, or both.

5. The method of claim 4, wherein determining the aggregate linguistic pattern of the user comprises determining a relationship between one or more spoken words of the oral communication, one or more written words of the written communication, or both.

6. The method of claim 4, wherein the communication from the user comprises both the oral communication and the written communication, the method further comprising:
   comparing a sentence structure of the oral communication from the user with a sentence structure of the written communication from the user, wherein determining the aggregate linguistic pattern of the user is based at least in part on comparing the sentence structure of the oral communication from the user with the sentence structure of the written communication from the user.

7. The method of claim 1, further comprising:
   receiving a second communication from the user, wherein the aggregate linguistic pattern of the user is updated based at least in part on receiving the second communication, and wherein a second natural-language communication message is generated based at least in part on updating the aggregate linguistic pattern of the user.

8. The method of claim 1, wherein determining the aggregate linguistic pattern of the user comprises determining a preferred sentence structure of the user, wherein the natural-language communication message comprises the preferred sentence structure of the user.

9. An apparatus for generating a natural-language communication message at an automation system of a premises, comprising:
   a processor;
   a memory in electronic communication with the processor; and
   instructions stored in the memory, the instructions being executable by the processor to:
   receive a communication from a user;
   determine, based at least in part on receiving the communication, an aggregate linguistic pattern of the user that is based at least in part on a comparison of an oral linguistic pattern of the user with a written linguistic pattern of the user;
   identify system information to communicate to the user, wherein the system information is associated with a status of the automation system in relation to the premises; and
   generate the natural-language communication message based at least in part on the aggregate linguistic pattern of the user and the identified system information, the natural-language communication message comprising a notification of the identified system information.

10. The apparatus of claim 9, wherein the instructions are further executable to instruct the processor to:
    identify one or more words or phrases of the user based at least in part on receiving the communication, wherein determining the aggregate linguistic pattern of the user is based at least in part on identifying the one or more words or phrases.

11. The apparatus of claim 10, wherein the instructions are further executable to instruct the processor to:
identify a geographical region associated with the one or more words or phrases of the user, wherein the natural-language communication message is based at least in part on the geographical region associated with the one or more words or phrases of the user.

12. The apparatus of claim 9, wherein the communication from the user comprises an oral communication from the user, a written communication from the user, or both.

13. The apparatus of claim 12, wherein determining the aggregate linguistic pattern of the user comprises determining a relationship between one or more spoken words of the oral communication, one or more written words of the written communication, or both.

14. The apparatus of claim 12, wherein the communication from the user comprises both the oral communication and the written communication, and wherein the instructions are further executable to instruct the processor to:
compare a sentence structure of the oral communication from the user with a sentence structure of the written communication from the user, wherein determining the aggregate linguistic pattern of the user is based at least in part on comparing the sentence structure of the oral communication from the user with the sentence structure of the written communication from the user.

15. The apparatus of claim 9, wherein the instructions are further executable to instruct the processor to:
receive a second communication from the user, wherein the aggregate linguistic pattern of the user is updated based at least in part on receiving the second communication, and wherein a second natural-language communication message is generated based at least in part on updating the aggregate linguistic pattern of the user.

16. The apparatus of claim 9, wherein determining the aggregate linguistic pattern of the user comprises determining a preferred sentence structure of the user, wherein the natural-language communication message comprises the preferred sentence structure of the user.

17. A computer-program product for generating a natural-language communication message at an automation system of a premises, the computer-program product comprising a non-transitory computer-readable medium storing instructions executable by a processor to:
receive a communication from a user;
determine, based at least in part on receiving the communication, an aggregate linguistic pattern of the user that is based at least in part on a comparison of an oral linguistic pattern of the user with a written linguistic pattern of the user;
identify system information to communicate to the user, wherein the system information is associated with a status of the automation system in relation to the premises; and
generate the natural-language communication message based at least in part on the aggregate linguistic pattern of the user and the identified system information, the natural-language communication message comprising a notification of the identified system information.

18. The computer-program product of claim 17, wherein the instructions are further executable by the processor to:
identify one or more words or phrases of the user based at least in part on receiving the communication, wherein determining the aggregate linguistic pattern of the user is based at least in part on identifying the one or more words or phrases.

19. The computer-program product of claim 18, wherein the instructions are further executable by the processor to:
identify a geographical region associated with the one or more words or phrases of the user, wherein the natural-language communication message is based at least in part on the geographical region associated with the one or more words or phrases of the user.

20. The computer-program product of claim 17, wherein the communication from the user comprises an oral communication from the user, a written communication from the user, or both.

* * * * *